(12) United States Patent
Tavares Miranda

(10) Patent No.: US 9,688,334 B2
(45) Date of Patent: Jun. 27, 2017

(54) CHAIN GUARD SYSTEM LOCK NUT

(71) Applicant: MIRANDA & IRMÃO, LDA., Águeda (PT)

(72) Inventor: João Filipe Tavares Miranda, Águeda (PT)

(73) Assignee: MIRANDA & IRMAO, LDA., Agueda (PT)

( * ) Notice: Subject to any disclaimer, the term of this patent is extended or adjusted under 35 U.S.C. 154(b) by 120 days.

(21) Appl. No.: 14/657,740

(22) Filed: Mar. 13, 2015

(65) Prior Publication Data
US 2016/0114848 A1  Apr. 28, 2016

(30) Foreign Application Priority Data

Jan. 14, 2014 (DE) .................. 10 2014 100 367

(51) Int. Cl.
*B62J 13/00* (2006.01)
*B62M 6/55* (2010.01)

(52) U.S. Cl.
CPC ................ *B62J 13/00* (2013.01); *B62M 6/55* (2013.01)

(58) Field of Classification Search
CPC .................................. B62M 6/55; B62J 13/00
See application file for complete search history.

(56) References Cited

U.S. PATENT DOCUMENTS

2013/0153321 A1\* 6/2013 Preining .................. B62M 6/55
180/206.7

FOREIGN PATENT DOCUMENTS

CN          201756151 U      3/2011

\* cited by examiner

*Primary Examiner* — William E Dondero
*Assistant Examiner* — Robert T Reese
(74) *Attorney, Agent, or Firm* — Lucas & Mercanti, LLP

(57) ABSTRACT

The present application describes a chain guard system lock nut comprising an electric motor (7) wherein the sprocket rotates at an angular speed different from the crank speed (2). The present application discloses a bike chain guard system lock nut designed to protect the clothing of the user from fouling or being caught between the chain and the sprocket, thereby avoiding accidents, but also, and by means of the chain guard (4), avoiding the chain from releasing from the sprocket in the bottom bracket (8). This lock nut is assembled together with the sprocket directly on the bottom bracket.

5 Claims, 2 Drawing Sheets

CHAIN GUARD SYSTEM LOCK NUT

CROSS-REFERENCE TO RELATED APPLICATION

This Application claims the priority of German Patent Application No. 102014100367.5 filed on Jan. 14, 2014, the contents of which is incorporated herein by reference.

TECHNICAL FIELD

The present application discloses a lock nut for a chain guard system which may be applied in bikes.

BACKGROUND OF THE INVENTION

From the state of the art chain guard systems are known, which are used in electric motor bikes, wherein the chain guard rotates in solidary manner with the entire system and wherein the assembly of several components is required due to the complexity thereof. Typically, the guard, crank and sprocket are joined together by tightening screw and nut systems and wherein the entire assembly is then threaded to the engine by means of a screw.

CN201756151U discloses precisely one of such chain guard systems which is directly tightened to the electric motor chassis. However, this document does neither anticipate nor gives clues about a chain guard system lock nut which is directly tightened to the bottom bracket as the one herein presented.

With the new generation of electric motors, manufacturers suggest that the sprocket should not rotate integral with the crank, which in this case involves a separation of the crank, guard and sprocket assembly.

With the technology presented in the present application, these problems are completely overcome.

SUMMARY OF THE INVENTION

The present application describes a chain guard system lock nut incorporating a tightening system on the bottom bracket and comprising the following elements:
 crank;
 chain guard;
 sprocket;
 electric motor;
 bottom bracket.

In one embodiment, the distance between the guard and sprocket of the chain guard system lock nut is less than the thickness of the chain.

In another embodiment, the chain guard system lock nut comprises a chamfer.

The present application also describes a method for assembling the chain guard system lock nut together with the sprocket.

The present application further describes a bike comprising the chain guard system lock nut described above.

The present application further describes a bicycle comprising the chain guard system lock nut described above.

DETAILED DESCRIPTION OF THE INVENTION

The present application discloses a bike chain guard system lock nut designed to protect the clothing of the user from fouling or being caught between the chain and the sprocket, thereby avoiding accidents, but also avoiding the chain from releasing from the sprocket in the bottom bracket.

Unlike prior art systems, this solution incorporates a chain guard system on the bottom bracket for electric motor bicycles, wherein the sprocket rotates at an angular speed different from the crank speed, as the chain guard always rotates in solidary manner with the entire system.

This technology provides that the chain guard is held along with the sprocket in the bottom bracket. Therefore, the guard shall have an angular speed equal to that of the sprocket and different from the angular speed of the crank, which depends on the characteristics of the electric motor.

The advantages of the technology herein disclosed over the systems already available in the market are:
 A decrease in costs inherent to the system, since only one piece is required for protection purposes;
 A decrease in the complexity of the entire system;
 A decrease in the number of components to be assembled which corresponds to a time drop on assembly lines;
 Numerous mechanical connections are no longer required to tighten the chain guard system;
 System weight decrease which implies a decrease in the total weight of the bike.

BRIEF DESCRIPTION OF THE DRAWINGS

For an easier understanding of the technique, drawings are herein attached, which represent preferred embodiments and which, however, are not intended to limit the scope of the present application.

DESCRIPTION OF THE EMBODIMENTS

The present application describes a chain guard system lock nut for a bike, preferably a bicycle, comprising an electric motor (7) wherein the sprocket rotates at an angular speed different from the crank speed (2).

Figure 1:
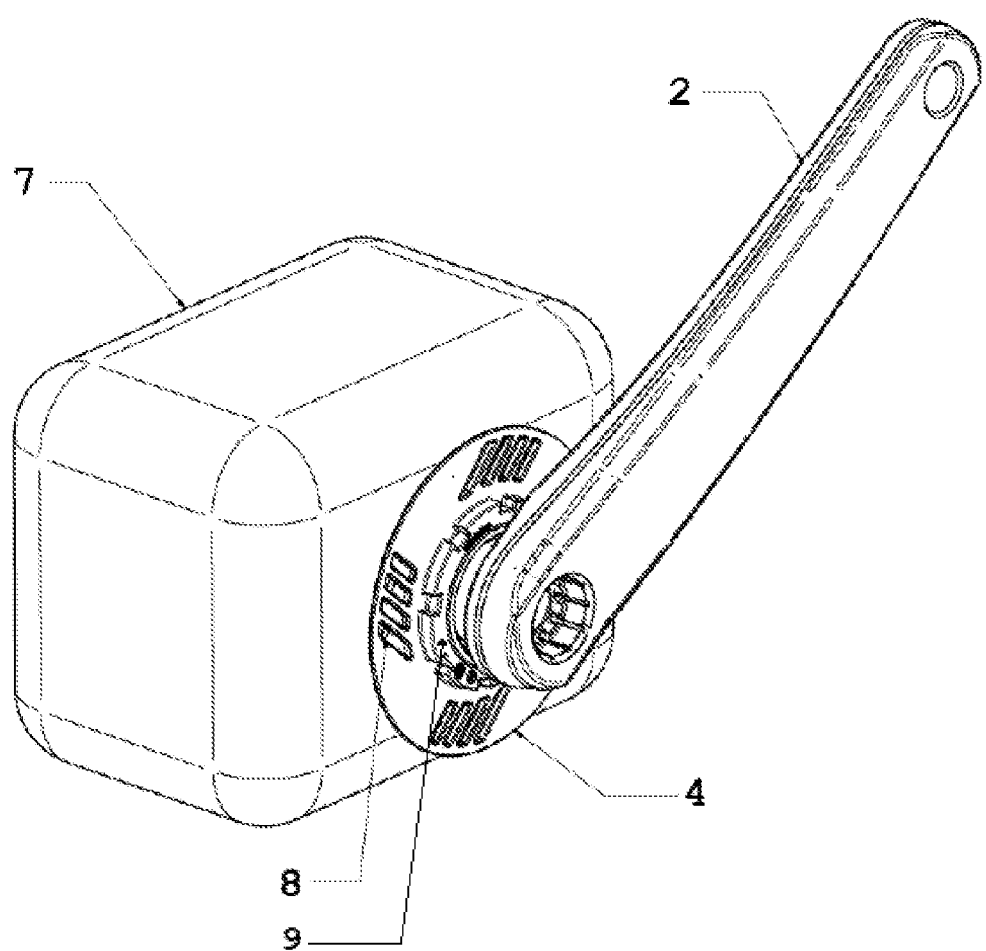
FIG. 1 is a representation of a new type of electric motors for bikes with the addition of a chain guard system lock nut, wherein reference numbers represent:
 2—crank;
 3—sprocket;
 4—chain guard;
 7—electric motor;
 8—bottom bracket;
 9—system lock nut.

The system lock nut (9) may have a protective design as that which is illustrated in FIG. 1. This system lock nut is mounted together with the sprocket (3), the system lock nut not needing to be applied since a tightening system is already provided within the chain guard system itself. This system lock nut enables the sprocket or pulley to rotate at the same speed as that of the chain guard (4) thus leaving the crank (2) free from such rotation. It also provides easy and fast assembly of the entire system, without the need for any additional tightening systems, including the transmission system lock nut (9) which is provided with the motor.

Due to an improved simplicity in the system, the technology herein developed enables an easier assembly/replacement, allowing faster assembly which means a time drop in assembly lines and/or replacement operations within the system. There is also a reduction in weight associated with the improved simplicity of the system, since screws and lock nuts are not required in the sprocket guard.

Another feature of the technology herein disclosed is to prevent the chain or belt from being trapped between the sprocket or belt pulley and the chain guard thus avoiding accidents. This feature is ensured by a distance A between the guard and the sprocket less than the thickness of the chain or belt, thereby preventing the chain or belt from entering into this free space between transmission and guard systems.

Figure 2:
FIG. 2 is a representation of the chain with the chain guard system applied, particular emphasis being given to the chamfer and the distance A between the guard and the sprocket, wherein reference numbers represent:
 10—chain;
 11—chamfer.

In order to prevent the chain from contacting the guard in the event of a bicycle being equipped with a rear derailleur, a chamfer (11) may be introduced, as shown in FIG. 2, which provides enough space to prevent the chain (10) from contacting the guard, thus allowing the system to incorporate smaller sprockets than a conventional system for latest generation engines, and the chain is unlikely to touch the bottom of the guard.

APPLICATION EXAMPLES

An application example is hereinafter described, which however is not intended to limit the scope of the present application.

One way to achieve this technology is by means of the manufacture of a guard, by means of a progressive tool, the guard having the shape shown in FIG. 1 and being made of steel plate or other material so that the user is protected from the chain.

Another alternative would be by plastic injection thus ensuring a low weight system.

The present embodiment is of course in no way restricted to the embodiments herein described and a person of ordinary skill in the art will be capable of providing many modification possibilities thereto without departing from the general idea of the invention as defined in the claims.

The embodiments described above are obviously combinable with each other. The following claims define further preferred embodiments.

The invention claimed is:

1. A chain guard system comprising:
   a lock nut with an integrated chain guard, forming one body,
   wherein the lock nut joins a sprocket directly to the chain guard such that the sprocket and the system each rotate at a first angular speed and a crank rotates at a second angular speed independent of the first angular speed.
2. The chain guard system according to claim 1, wherein the distance between the guard and the sprocket is less than the thickness of the chain.
3. The chain guard system according to claim 1, wherein the lock nut further comprises an integrated annular protrusion having a chamfer.
4. A method for assembling the chain guard system according to claim 1, comprising assembling the elements thereof together with the sprocket.
5. A bicycle comprising the chain guard system according to claim 1.

* * * * *